United States Patent [19]

Frerichs et al.

[11] Patent Number: 4,732,198
[45] Date of Patent: Mar. 22, 1988

[54] VEHICLE WHEEL

[75] Inventors: Udo Frerichs, Langenhagen; Heinz-Dieter Rach, Garbsen, all of Fed. Rep. of Germany

[73] Assignee: Continental Gummi-Werke Aktiengesellschaft, Hanover, Fed. Rep. of Germany

[21] Appl. No.: 896,384

[22] Filed: Aug. 13, 1986

[30] Foreign Application Priority Data

Aug. 17, 1985 [DE] Fed. Rep. of Germany ....... 3529512

[51] Int. Cl.⁴ .......................................... B60C 15/024
[52] U.S. Cl. .................. 152/544; 152/379.3; 152/379.5; 152/DIG. 20
[58] Field of Search ............ 152/544, 539, 543, 379.3, 152/379.4, 379.5, DIG. 20, 380, 381.3, 387, 513

[56] References Cited

U.S. PATENT DOCUMENTS 4,563,042 1/1986 Seitz et al. ....................... 152/379.3
4,635,697 1/1987 Rach et al. .......................... 152/544

FOREIGN PATENT DOCUMENTS 3000428 7/1981 Fed. Rep. of Germany .
0015779 8/1893 United Kingdom ............... 152/380

Primary Examiner—Jerome Massie
Assistant Examiner—Geoffrey L. Knable
Attorney, Agent, or Firm—Becker & Becker, Inc.

[57] ABSTRACT

A vehicle wheel has a pneumatic tire mounted thereon. The wheel has a rigid rim having essentially radially inwardly extending rim flanges and, on the radially inner side of the rim ring, the rim has respective mounting spaces, each with a deep mounting bed. The pneumatic tire is provided with tire beads having a cross-sectional form which, on the one hand, permits the tire bead to extend into the mounting space and deep bed during mounting, in which, on the other hand, closes-off the mounting space and deep bed when the tire is in its operational state. In order to disconnect the tire seat from the rim support surfaces, it is proposed that the deep mounting bed extend directly to the rim flange, and that, in the operational state of the tire, on the one hand the tire bead be spaced from that portion of the rim ring that is adjacent to the rim flange, and on the other hand a portion of the tire bead butt axially inwardly against a portion of the rim.

12 Claims, 2 Drawing Figures

VEHICLE WHEEL

BACKGROUND OF THE INVENTION

1. Field of the Invention

The present invention relates to a vehicle wheel on which is mounted a pneumatic tire, including a rigid rim and a pneumatic vehicle tire that is made of rubber or rubber-like synthetic materials and is provided with a carcass which is secured in the beads by being looped around inextensible and pressure-resistant bead cores; the rim has essentially radially inwardly extending rim flanges and, on the radially inner side of the rim ring, the rim has respective mounting spaces, each with a deep mounting bed that is defined by perpendicular and/or inclined walls of the rim, with the tire bead having a cross-sectional form which, on the one hand, permits the tire bead to extend into the mounting space and deep bed during mounting and which, on the other hand, closes-off the mounting space and deep bed region when the tire is in its operational state.

2. Description of the Prior Art

A similar vehicle wheel and tire assembly is described in copending, allowed U.S. patent application Ser. No. 701,952, which was filed Feb. 15, 1985, and belongs to the assignee of the present invention. This known vehicle wheel and tire assembly of this allowed U.S. patent application which has matured into U.S. Pat. No. 4,635,697—Rach et al dated Jan. 13, 1987 belonging to the assignee of the present invention, as well as the one disclosed also in German Offenlegungsschrift No. 30 00 428, is particularly well-suited for a so-called flat tire operation because, in the event of pressure loss, the tire may be supported on relatively large support surfaces of the rim ring, and because it may deflect laterally outwardly, with the result that no kinks are produced during flat tire operation.

In many known vehicle wheels, however, the support surfaces frequently still do not have an optimum configuration because there is a stepped arrangement between those portions of the rim ring situated opposite the seating surface of the tire, and those portions situated opposite the deep mounting bed. In addition, the vehicle wheel and tire assembly known from the aforementioned U.S. Pat. No. 4,635,697—Rach et al dated Jan. 13, 1987 requires a relatively large mounting space to permit the tire to be mounted. Finally, it is disadvantageous that, in the known vehicle wheels, a very large portion of the inner walls of the tire has to be made of metal in order to achieve an airtight seating on the rim.

An object of the present invention therefore is to provide a vehicle wheel and tire assembly which retains the advantages of the known vehicle wheel and tire assembly, yet which no longer has the aforementioned disadvantages.

SUMMARY OF THE INVENTION

According to the invention, this object is realized by having the deep mounting bed extend directly to the rim flange, and by, in the operational state of the tire, on the one hand having the tire spaced from that portion of the rim ring adjacent to the rim flange, and on the other hand having a portion of the tire bead butt axially inwardly against a portion of the rim.

The present invention achieves the advantage whereby the tire bead has a smaller overall height. This, in turn, leads to several other advantages. On the one hand, the width of the introduction opening into the mounting space for the tire bead may be reduced, as may be the entire mounting arrangement. The spacing between the radially outer edge of the tire bead and the rim ring permits the tire seat to be disconnected from the rim support surface, so that there is a free choice for the design of the support surfaces. In particular, the rim ring may be formed as a virtually horizontal support surface over the entire width of the mounting space on the radially outer side.

Although older vehicle wheel and tire assemblies are known wherein a tire bead is mounted at a distance from the rim ring, these known arrangements run the risk of the bead lifting off of its seat on the rim flange when lateral forces are introduced into the carcass—e.g. by driving at an angle against curbs. A reliable rim seat that is secure in all operational situations is achieved only by the additional feature of the present invention, whereby the tire bead is permitted to butt against an axially inner portion of the rim.

Furthermore, the invention is advantageous because, compared with known vehicle wheel and tire assemblies, a smaller region of the inner wall of the tire has to be made of metal to achieve an airtight rim seat. In turn, this leads to simpler manufacturing processes for the tire, and simpler-constructed vulcanizing devices. Finally, another advantage is a considerably simplified means for demounting the tire because, with an uninflated tire, the tire bead can be locally pressed radially outwardly, so that a demounting tool can easily be inserted into the mounting space.

Advantageous specific embodiments of the invention are described in detail subsequently.

BRIEF DESCRIPTION OF THE DRAWING

One exemplary embodiment of the invention is explained hereinafter with reference to a drawing, in which.

DESCRIPTION OF PREFERRED EMBODIMENTS

Figure 1:
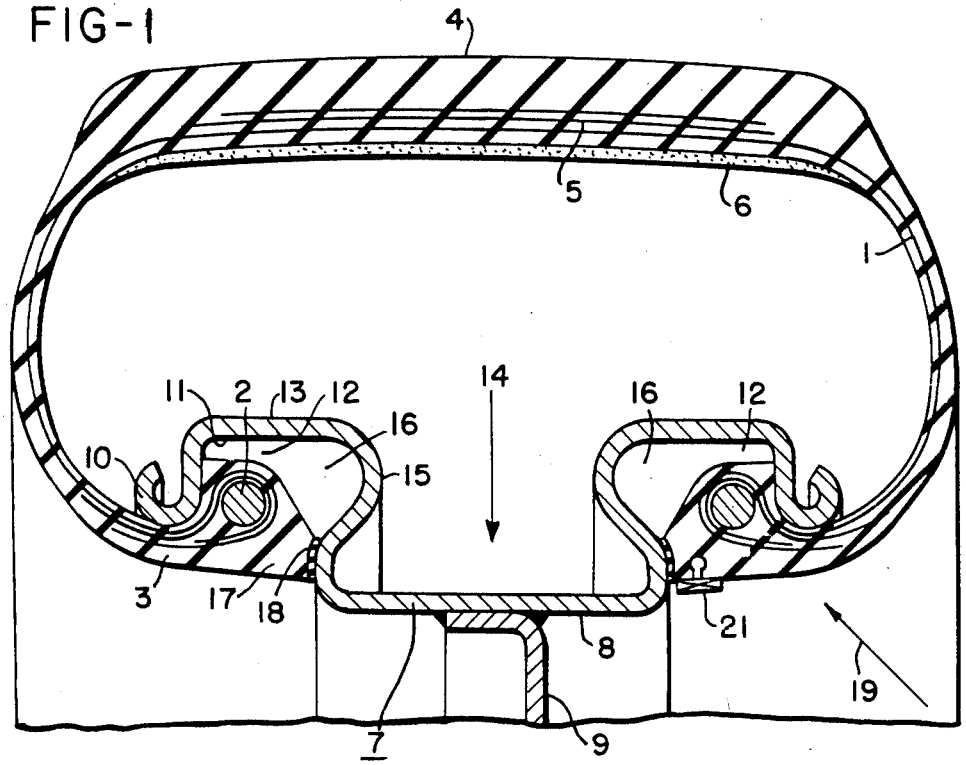
FIG. 1 is a partial, radial cross-sectional view through a vehicle wheel and tire assembly having a one-piece rim and a tire that is mounted on the rim flange.
Figure 2:
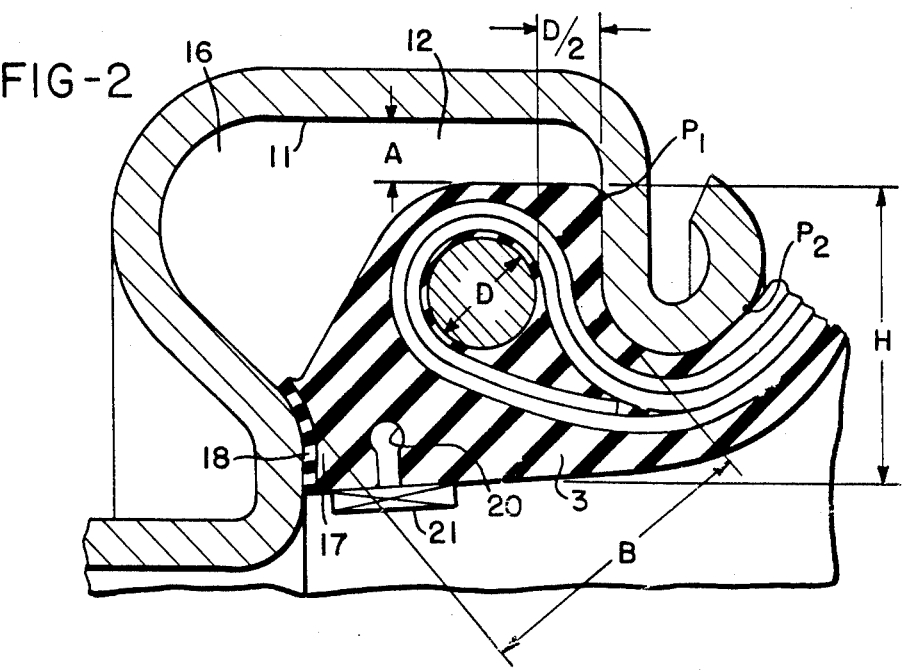
FIG. 2 is a view that shows an enlarged portion of the vehicle wheel and tire assembly of FIG. 1 in the region of the installation chamber or mounting space for a tire bead.

FIGS. 1 and 2 show a vehicle wheel and tire assembly in the mounted state. The pneumatic vehicle tire used therewith is substantially formed from rubber or rubber-like materials, and has a radial carcass 1—which could, if desired, also be an angular or bias carcass—and which is secured in the beads 3 by having its ends wound around inextensible and pressure-resistant bead cores 2. A belt 5, which is inextensible in the circumferential direction and comprises two or more fabric cord plies, is disposed beneath the tread strip 4 between the latter and the carcass 1, and provides the tire body with lateral stabilization. In addition, the inner surface of the tire, approximately in the region of the tread strip 4, has a thin sliding layer 6 that permits low-friction support on the rim 7 in the event of a puncture or flat tire.

The rim ring 8 of a one-piece rim 7 is preferably made of metal, and is welded to a rim dish 9. When viewed in cross-section, the rim ring 8 terminates laterally or axially outwardly in an essentially radially inwardly extending rim flange 10. As shown in FIGS. 1 and 2, recessed mounting portions or deep mounting beds 12 for the tire beads 3 extend integrally and axially inwardly adjacent to the rim flanges 10, so that the tire beads 3 are disposed at a distance A from the portion 11 of the rim ring 8. At the level of the deep mounting beds 12, the radially outer portions of the rim ring 8 form essentially horizontal support surfaces 13 for the tire. These support surfaces may extend over the entire width of the mounting spaces. A drop base 14, which is open in a radially outwardly direction and which widens in a radially inwardly direction, is disposed in the center of the rim ring 8, so that the side walls 15 of the rim ring 8 defining the drop base 14 initially extend vertically or perpendicularly and then extend at an acute angle to the radially inner wall of the drop base 14 in a laterally and outwardly direction as shown in FIG. 1.

As shown in FIG. 1, the described form of the rim ring 8 provides a mounting space 16 on each side of the drop base 14 that is closed on three sides for the tire bead 3 and located axially inwardly of respective rim flanges and radially inside the rim ring 8 between side walls 15 and rim flange 10, while the fourth side is closed by the tire bead 3 itself after the tire has been mounted. For this purpose, the radially and axially inner region of the tire bead 3 has a circumferential thickened portion 17.

The distance A (FIG. 2) between the radially outer edge of the tire bead and the adjacent radially inner portion 11 of the rim ring 8, which determines the radial height of the deep mounting bed 12, essentially corresponds to the height of already known deep mounting beds.

The height H of the tire bead 3 determines the width B of the insert aperture or introduction opening into the mounting space 16 in such a manner that it can be selected according to the equation $B \geq H$. So that the tire bead 3 is permanently protected from being damaged due to wear in the region of its thickened portion 17, which axially inwardly butts against the rim ring, the tire bead 3 may be provided at that location with an additional fabric reinforcement 18.

In order to ensure that the tire has an airtight seat on the rim, the inner wall of the tire is made of metal in the region that butts against the rim flange 10 between P1 and P2. Compared with known vehicle wheel and tire assemblies, this region is considerably reduced, and there is only one compression point for the tire seat because the bead 3 no longer butts against portion 11 of the rim ring 8.

The bead seat should be selected in such a way that the bead core 2 extends into the space adjacent the rim flange 10 with at least half of its cross-section, but preferably with all of its cross-section. According to a preferred embodiment, the bead core 2 is spaced from the rim flange 10 at a distance that approximately corresponds to half the cross-sectional diameter D/2. So that compression forces that are too great do not occur in the region of the tire seat, the radius of curvature of the rim flange 10 at the radially inner surface that is in contact with the tire should be greater than the radius of curvature of the bead core cross-section.

To mount the tire, the rim 7 is initially moved towards the tire, essentially at right angles thereto, until the widest diameter of the rim is disposed in the interior of the tire. After a rotational movement of approximately 90°, the axes of rotation of the tire and of the rim 7 extend parallel to one another, and the tire beads 3 are laterally and externally adjacent to the associated rim flanges 10.

Initially, one tire bead 3 is introduced into the mounting space 16 in the direction of the arrow 19 (FIG. 1)—possibly with a slight pivotal movement about the bead core 2.

The deep mounting bed 12 has such dimensions that the tire bead 3 can be lifted over the rim flange 10 on the opposite side when fully inserted.

After the entire circumferences of both tire beads 3 are disposed in the respective mounting space 16 with the deep bed 12, the tire is inflated with air. In so doing, the tire beads 3 are drawn onto the seating surfaces of the rim flanges 10 while being simultaneously pivoted about the bead cores 2, and the mounting space 16 is automatically closed-off by the thickened portions 17. To demount the tire, the air is first let out of the tire. The tire bead 3 can then be forced into the deep mounting bed 12 at one point in a radially outward direction, whereby the thickened portion 17 is simultaneously pivoted and enters the mounting space 16. It is then readily possible for a demounting tool to be introduced into the mounting space 16, by means of which tool the tire can be demounted in a simple and known manner.

So that the above-described vehicle wheel and tire assembly can be balanced in as simple a manner as possible, recesses 20 are provided in the radially inner region of the tire bead 3, said recesses being spaced from one another in the circumferential direction, and having counterweights 21 mounted therein.

The present invention is, of course, in no way restricted to the specific disclosure of the specification and drawing, but also encompasses any modifications within the scope of the appended claims.

We claim:

1. In a wheel and tire assembly for a vehicle, whereby the wheel has a rigid rim with a rim ring that, starting from the center, first extends axially outwardly in both directions, then extends radially outwardly first perpendicularly and then at an acute angle as to said first axially outwardly extending rim ring portion to form side walls of a central drop base, then extends axially outwardly in both directions, and then extends essentially radially inwardly to form respective rim flanges, with respective mounting spaces being formed on each side of said drop base and located axially inwardly of respective rim flanges and radially inwardly of said rim ring between a respective drop base side wall and rim flange, each mounting space provided with a deep mounting bed, and whereby on said rim is mounted a pneumatic tire that is made of rubber or rubber-like synthetic material and has a carcass which is secured in the beads of said tire by being looped around inextensible and pressure-resistant bead cores respectively embedded in the beads of said tire, with each of said beads having a cross-sectional form such that during mounting, said beads can extend into said mounting spaces and said deep mounting beds, and when said tire is in the operational state, said beads cover access to said mounting spaces and said deep mounting beds, each said deep mounting bed having a radial height and forming that portion of each said mounting space which extends further radially outwardly than a radially outer edge of said bead when said tire is in said operational state, the improvement wherein each of said deep mounting beds respectively extends integrally to one of said rim flanges respectively, and wherein, in the operational state of said tire, on the one hand said radially outer edge of each of said tire beads respectively is spaced radially inwardly from a radial inner side of said axially extending portion of said rim ring that is adjacent each respective rim flange, and on the other hand an axially inner portion of each of said tire beads extends axially inwardly to butt against a portion of said rim ring.

2. A wheel and tire assembly according to claim 1, in which each of said tire beads has a thickened axially inner portion that extends axially inwardly to butt against a portion of one of said side walls of said drop base.

3. A wheel and tire assembly according to claim 2, in which the spacing of said radially outer edge of a given one of said tire beads from said radially inner side of said axially extending rim ring portion that is adjacent a given one of said rim flanges determines the radial height of said deep mounting bed.

4. A wheel and tire assembly according to claim 2, in which a given one of said tire beads has a given height in the radial direction in the mounted and operational state of said tire; and in which each of said mounting spaces has an introduction opening with a width that is at least of the magnitude of said height of said tire bead.

5. A wheel and tire assembly according to claim 2, in which said axially outwardly extending portions of said rim ring that are adjacent said rim flanges have radially outer sides that extend over the entire width of said mounting spaces and form essentially horizontal support surfaces.

6. A wheel and tire assembly according to claim 2, in which each of said rim flanges has a curved radially inner portion for contacting said tire, with said curved rim flange portion having a radius of curvature that is greater than the radius of curvature of a cross-section of said tire bead core.

7. A wheel and tire assembly according to claim 2, in which said tire has metallic inner portions that rest against said rim flanges.

8. A wheel and tire assembly according to claim 2, in which, in the operational state of said tire, at least one half of the cross-section of each of said bead cores is disposed in the mounting space adjacent said rim flanges.

9. A wheel and tire assembly according to claim 8, in which said bead cores are disposed entirely in the mounting space adjacent said rim flanges.

10. A wheel and tire assembly according to claim 2, in which each of said bead cores is spaced from a corresponding rim flange by a distance in the axial direction corresponding approximately to half of the cross-sectional diameter of that bead core.

11. A wheel and tire assembly according to claim 2, in which each of said thickened axially inner portions of said tire beads is provided with a fabric reinforcement in the region where said thickened portions butt against said side walls of said drop base.

12. A wheel and tire assembly according to claim 2, in which each of said tire beads, when viewed in the mounted and operational state of said tire, is provided on the radially inner side with recess means for receiving and securing counterweights.

* * * * *